US012467986B2

(12) United States Patent
Collins, IV et al.

(10) Patent No.: US 12,467,986 B2
(45) Date of Patent: Nov. 11, 2025

(54) PLATFORM FOR PRECISE THERMAL REGULATION OF CRYOGENIC ELECTRONIC CIRCUITS

(71) Applicant: The United States of America, as represented by the Secretary of the Navy, San Diego, CA (US)

(72) Inventors: James J. Collins, IV, San Diego, CA (US); Susan Anne Elizabeth Berggren, San Diego, CA (US); Erica L. Daly, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 391 days.

(21) Appl. No.: 18/180,914

(22) Filed: Mar. 9, 2023

(65) Prior Publication Data

US 2024/0302455 A1 Sep. 12, 2024

(51) Int. Cl.
  *G01R 33/00* (2006.01)
  *G01R 33/035* (2006.01)
  *G01S 3/04* (2006.01)

(52) U.S. Cl.
  CPC ....... *G01R 33/007* (2013.01); *G01R 33/0354* (2013.01); *G01S 3/043* (2013.01)

(58) Field of Classification Search
  CPC .... G01R 33/007; G01R 33/0354; G01S 3/043
  USPC ....................................................... 324/224
  See application file for complete search history.

(56) References Cited

U.S. PATENT DOCUMENTS

2015/0367348 A1\* 12/2015 Sano .................... B01L 7/5255
                                                                  435/286.1

FOREIGN PATENT DOCUMENTS

CN           203534313 U   \*  4/2014

OTHER PUBLICATIONS

Zhu et al.; CN 203534313 U; Apr. 9, 2014; Translated by Clarivate (Year: 2014).\*

\* cited by examiner

*Primary Examiner* — Eman A Alkafawi
*Assistant Examiner* — Rahul Maini
(74) *Attorney, Agent, or Firm* — Naval Information Warfare Center; Kyle Eppele

(57) ABSTRACT

A platform provides precise thermal regulation of cryogenic electronic circuits. The platform includes a cold distribution plate, cold blades, heaters, and a thermal regulator. The cold distribution plate couples to a cryogenic cooler for cooling the cold distribution plate. The cold blades contact and extend from a periphery of the cold distribution plate. The cold blades support and cool the cryogenic electronic circuits, which include a respective cryogenic electronic circuit disposed on each of the cold blades. The heaters heat the cold blades, with the heaters including a respective heater disposed at each of the cold blades. The thermal regulator controls the heaters to maintain a predetermined temperature at each of the cryogenic electronic circuits.

20 Claims, 2 Drawing Sheets

PLATFORM FOR PRECISE THERMAL REGULATION OF CRYOGENIC ELECTRONIC CIRCUITS

FEDERALLY SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; NIWC_Pacific_T2@us.navy.mil. Reference Navy Case Number 111232.

BACKGROUND OF THE INVENTION

Previous attempts at direction finding for radio-frequency electromagnetic radiation has failed because the recovered signals were much smaller than various noise effects. There is a general need for precise direction finding despite such noise.

SUMMARY OF THE INVENTION

A platform provides precise thermal regulation of cryogenic electronic circuits. The platform includes a cold distribution plate, cold blades, heaters, and a thermal regulator. The cold distribution plate couples to a cryogenic cooler for cooling the cold distribution plate. The cold blades contact and extend from a periphery of the cold distribution plate. The cold blades support and cool the cryogenic electronic circuits, which include a respective cryogenic electronic circuit disposed on each of the cold blades. The heaters heat the cold blades, with the heaters including a respective heater disposed at each of the cold blades. The thermal regulator controls the heaters to maintain a predetermined temperature at each of the cryogenic electronic circuits.

BRIEF DESCRIPTION OF DRAWINGS

Throughout the several views, like elements are referenced using like references. The elements in the figures are not drawn to scale and some dimensions are exaggerated for clarity.

DETAILED DESCRIPTION

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

The inventors have discovered that the noise in previous attempts at direction finding using SQUID sensors is compounded by temperature effects, especially differences in the temperatures of the SQUID sensors caused by the ambient thermal and radiation environment. For example, a strong heat source positioned broadside to one SQUID sensor, but more tangential to the other SQUID sensors, will disproportionately raise the temperature of the broadside SQUID. This temperature difference results in output voltage offsets that obscure the desired signal detection. The inventors have also discovered that the noise includes internally generated temperature differences, such power dissipations in SQUID sensors that vary depending upon the propagation direction of received radio-frequency electromagnetic radiation. Upon recognizing such temperature effects caused the apparent noise, the inventors developed the disclosed embodiments for a platform for precise thermal regulation of cryogenic electronic circuits.

Although certain embodiments of the invention were motivated to improve direction finding using SQUID sensors, the invention is not limited to such disclosed embodiments. Instead, embodiments of the invention provide high thermal control and temperature uniformity among the temperature sensitive electronics of a variety of cryogenic applications. The platform can hold multiple electronics, each at a specified and potentially different temperature, across any chosen number of faces. Simultaneously, the platform is modular to accommodate adaptation to various cryogenic applications as needed.

This modular platform includes materials transparent to radio-frequency radiation along with the independent temperature control with temperature uniformity across multiple faces in a small package. The provided advantages of radio-frequency transparency, small size, and temperature control have not been previously achieved.

Figure 1A:
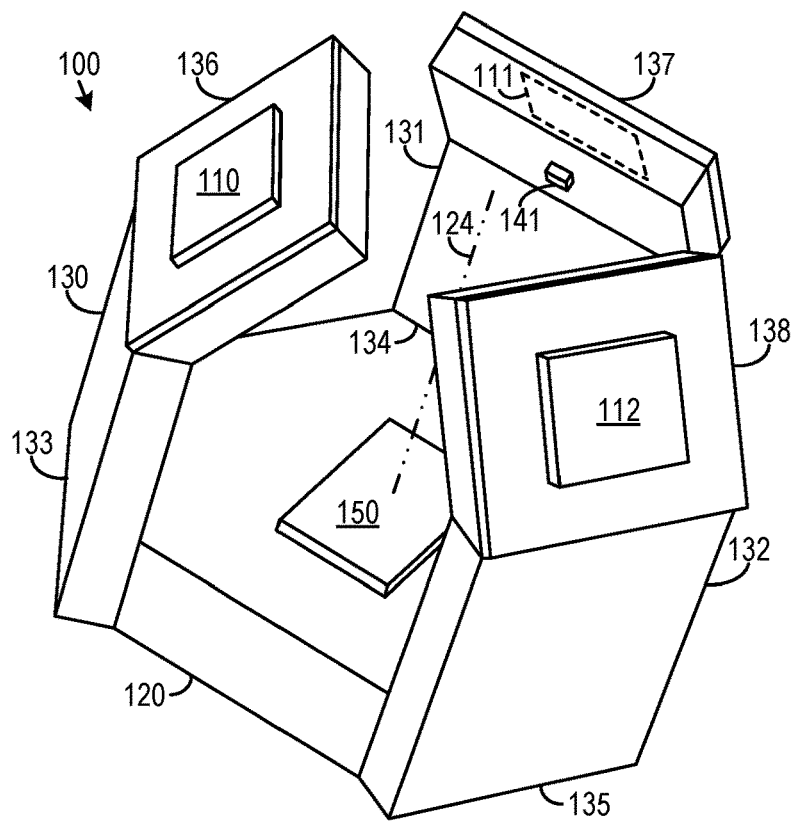
FIG. 1A is a perspective view of a simplified platform for precise thermal regulation of cryogenic electronic circuits in accordance with an embodiment of the invention.
Figure 1B:
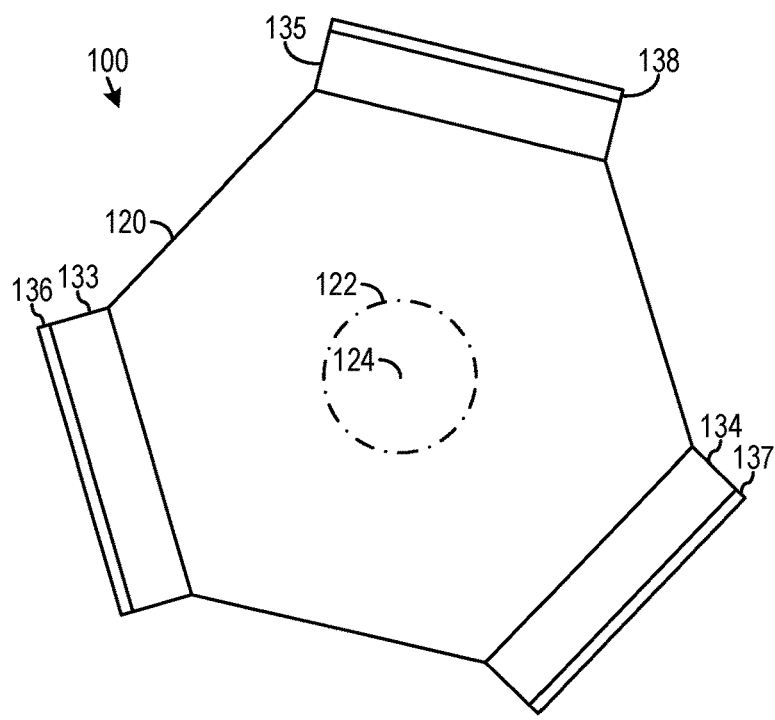
FIG. 1B is a bottom view of the platform of FIG. 1A.

FIG. 1A is a perspective view of a simplified platform 100 for precise thermal regulation of cryogenic electronic circuits 110, 111, and 112 in accordance with an embodiment of the invention. FIG. 1B is a bottom view of the platform 100 of FIG. 1A. The simplified platform 100 has an open structure for clearly showing the relationships between its component elements.

The platform 100 includes a cold distribution plate 120 for coupling to a cryogenic cooler for cooling the cold distribution plate 120. A contact region 122 of the cold distribution plate 120 is coupled to the end of a cold finger of the cryogenic cooler. The cryogenic cooler cools the cold finger to a cryogenic temperature, and hence cools the cold distribution plate 120.

Cold blades 130, 131, and 132 contact and extend from a periphery of the cold distribution plate 120. The cold blades 130, 131, and 132 support and cool the cryogenic electronic circuits 110, 111, and 112, respectively.

Heaters heat the cold blades 130, 131, and 132. The heaters including a respective heater 141 disposed at the cold blade 131 and similar respective heaters (not shown) disposed at cold blades 130 and 132. A thermal regulator 150 controls the heaters including heater 141 to maintain a predetermined temperature at each of the cryogenic electronic circuits 110, 111, and 112. In another embodiment, the thermal regulator 150 is externally disposed outside the cold zone, with appropriate communication interconnections.

The thermal regulator 150 controls the heaters including heater 141 to maintain the predetermined temperature of the respective cryogenic electronic circuit 110, 111, or 112 disposed on each of the cold blades 130, 131, and 132 despite variation in a thermal and radiation environment around the platform. For example, the thermal and radiation environment might include a strong heat source that emits infrared radiation from a direction broadside to cold blade 130, but more tangential to cold blades 131 and 132. This would cause greater absorption of the infrared radiation at cold blade 130 than at either cold blade 131 or 132. Under these example conditions, the thermal regulator 150 controls the heaters to compensate for the disproportionate heating of the electronic circuit 110 on cold blade 130 from the absorbed infrared radiation. This compensation would include heating cold blade 131 with heater 141 to balance the total heating between cold blades 130 and 131, and similarly heating cold blade 132 with its respective heater.

In one embodiment, the platform 100 includes three cold blades 130, 131, and 132. The three cold blades 130, 131, and 132 each include a spoke 133, 134, or 135 and a planar cold face 136, 137, or 138. The spokes 133, 134, and 135 extend between the periphery of the cold distribution plate 120 and the planar cold faces 136, 137, and 138 for supporting and cooling the respective cryogenic electronic circuits 110, 111, and 112 disposed on the planar cold faces 136, 137, and 138. The three planar cold faces 136, 137, and 138 do not touch and symmetrically surround an axis 124 perpendicular to a base plane through the cold distribution plate 120. The three planar cold faces 136, 137, and 138 are symmetrically disposed at an angle to the axis 124 so the three planar cold faces 136, 137, and 138 are mutually perpendicular.

In one embodiment, the platform 100 includes the cryogenic electronic circuits 110, 111, and 112. The respective cryogenic electronic circuit 110, 111, or 112 disposed on each of the three planar cold faces 136, 137, and 138 includes a field sensor for sensing a component of a magnetic field perpendicular to that planar cold face. When the magnetic field is static or slowly varying, the component of the magnetic field for each of the three planar cold faces 136, 137, and 138 collectively specify a vector describing a direction and a strength of the magnetic field. When electromagnetic radiation produces the magnetic field while propagating into the cryogenic electronic circuits 110, 111, and 112, the component of the magnetic field for each of the three planar cold faces 136, 137, and 138 collectively specify a vector describing a propagation direction and an amplitude of the electromagnetic radiation.

In one embodiment, the respective cryogenic electronic circuit 110, 111, or 112 disposed on each of the three planar cold faces 136, 137, and 138 includes a temperature sensor for sensing a junction temperature within the respective cryogenic electronic circuit 110, 111, or 112. In one embodiment, the respective heater 141 is disposed near a connection between the cold blade 131 and the cold distribution plate 120, and the respective heater 141 and the respective cryogenic electronic circuit 111 are disposed on opposite major surfaces of the planar cold face 137 for the cold blade 131. It will be appreciated that positions can be reversed with the heater 141 disposed on the outer major surface and the cryogenic electronic circuit 111 disposed on the inner major surface of the planar cold face 137. The respective heaters for the other cold blades 130 and 132 are disposed similarly.

The thermal regulator 150 controls the heaters including heater 141 to maintain the predetermined temperature at the temperature sensor for sensing the junction temperature within the respective cryogenic electronic circuit 110, 111, or 112 disposed on each of the three planar cold faces 136, 137, and 138.

In one embodiment, the cold distribution plate 120 is composed of copper that has a high thermal conductivity. The spokes 133, 134, and 135 of the cold blades 130, 131, and 132 are composed of aluminum nitride that is transparent to radio-frequency electromagnetic radiation and has an intermediate thermal conductivity providing some thermal resistance between the cold distribution plate 220 and the planar cold faces 136, 137, and 138. The planar cold face 136, 137, or 138 of each of the cold blades 130, 131, and 132 is composed of diamond that is transparent to radio-frequency electromagnetic radiation and has a high thermal conductivity. The high thermal conductivity of diamond equalizes the predetermined temperature across an extent of the respective cryogenic electronic circuit 110, 111, or 112 disposed on the planar cold face 136, 137, or 138. A support of aluminum nitride backs the diamond of the planar cold faces 136, 137, and 138.

Figure 2A:
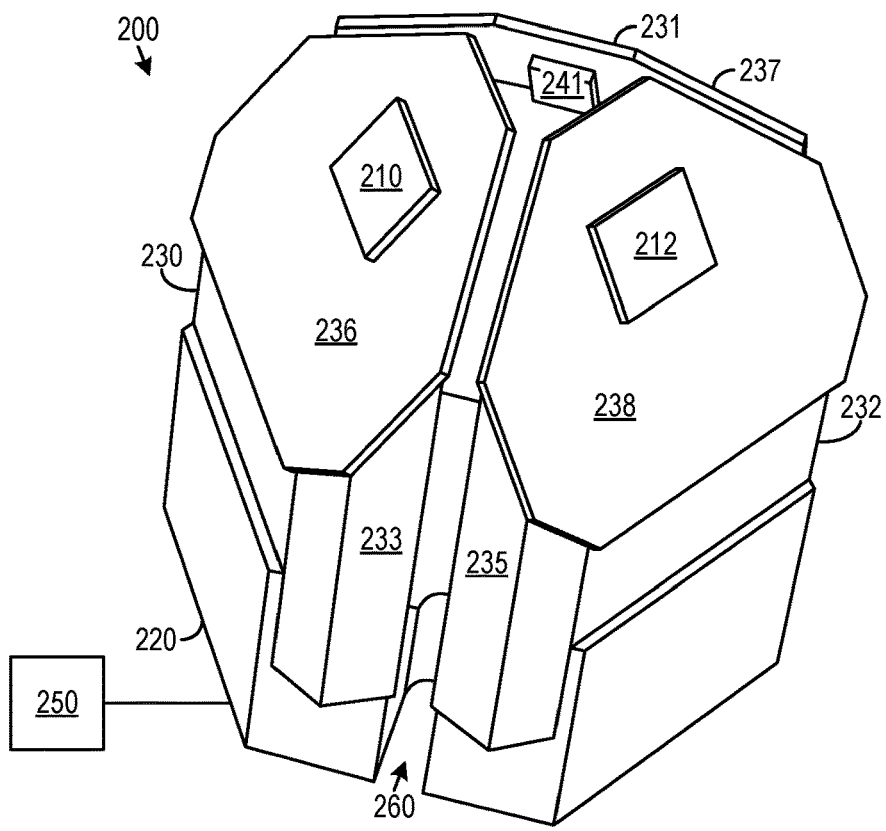
FIG. 2A is a perspective view of a platform for precise thermal regulation of cryogenic electronic circuits in accordance with an embodiment of the invention.
Figure 2B:
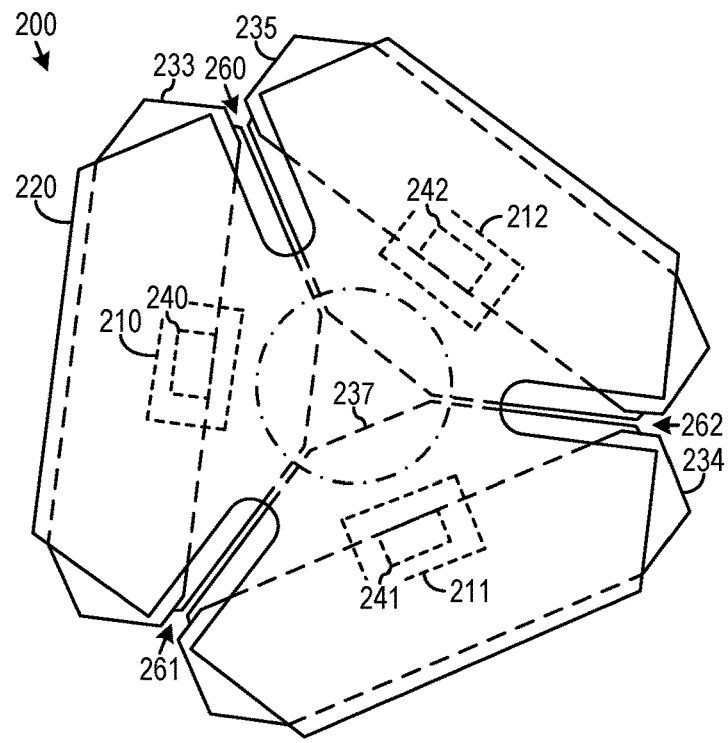
FIG. 2B is a bottom view of the platform of FIG. 2A.

FIG. 2A is a perspective view of a platform 200 for precise thermal regulation of cryogenic electronic circuits 210, 211, and 212 in accordance with an embodiment of the invention. FIG. 2B is a bottom view of the platform of FIG. 2A.

The platform 200 includes a cold distribution plate 220, cold blades 230, 231, and 232, heaters 240, 241, and 242, and an external thermal regulator 250. FIG. 2A shows only the heater 241 for cold blade 231, but FIG. 2B shows hidden dashed lines for all heaters 240, 241, and 242. Other reference numbers are shown spread across FIG. 2A and/or FIG. 2B.

The cold distribution plate 220 couples to a cryogenic cooler for cooling the cold distribution plate 220. The cold blades 230, 231, and 232 contact and extend from a periphery of the cold distribution plate 220. In one embodiment, the cold blades 230, 231, and 232 each include a spoke 233, 234, or 235 and a planar cold face 236, 237, or 238. A respective cryogenic electronic circuit 210, 211, or 212 is disposed on a planar cold face 236, 237, or 238 of each of the cold blades 230, 231, and 232. The cold blades 230, 231, and 232 support and cool the cryogenic electronic circuits 210, 211, and 212. In one embodiment, the three planar cold faces 236, 237, and 238 are mutually perpendicular.

The external thermal regulator 250 controls the heaters 240, 241, and 242 for heating the cold blades 230, 231, and 232, and thereby maintain a predetermined temperature at each of the cryogenic electronic circuits 210, 211, and 212. The heaters 240, 241, and 242 are resistors in one embodiment, and the external thermal regulator 250 controls the current through the resistors.

In one embodiment, unavoidable variations during fabrication of the cryogenic electronic circuits 210, 211, and 212 produce a spread of circuit characteristics. For example, a critical temperature has a normal distribution for one or more superconducting materials within a superconducting quantum interference device (SQUID) within each of the cryogenic electronic circuits 210, 211, and 212. Because of this, the cryogenic electronic circuits 210, 211, and 212 might have slightly different optimal operating temperatures. The external thermal regulator 250 independently controls the heaters 240, 241, and 242 so each cryogenic electronic circuits 210, 211, or 212 has its respective optimal operating temperature maintained independently.

In one embodiment, the respective cryogenic electronic circuit 210, 211, or 212 disposed on the planar cold face 236, 237, or 238 of each of the three cold blades 230, 231, and 232 includes a the field sensor for sensing a component of a magnetic field perpendicular to the planar cold face 236, 237, or 238. In one embodiment, the field sensor included in the respective cryogenic electronic circuit 210, 211, or 212 disposed on each of the three planar cold faces 236, 237, and 238 includes a superconducting quantum interference device (SQUID) for sensing the component of the magnetic field.

The SQUIDs in the cryogenic electronic circuit 210, 211, and 212 are each biased at an operating point preferably at a desired voltage and a desired current. In one embodiment, a current through each SQUID is biased at a nominally fixed current, and the voltage across the SQUID varies away from the operating point in proportion to the component of the magnetic field that is perpendicular to the planar cold face 236, 237, or 238 supporting the SQUID. For example, the magnetic field is the Earth's magnetic field, and the component of the Earth's magnetic field that is perpendicular to the planar cold face 236, 237, or 238 supporting each SQUID depends upon the orientation of the platform 200 relative to the Earth's magnetic field. Thus, the vector including the voltage sensed by the SQUID within each cryogenic electronic circuit 210, 211, and 212 specifies a direction and a strength of the Earth's magnetic field, and hence an orientation of the platform 200 relative to the Earth's magnetic field.

However, as the voltage across each SQUID varies, the power dissipated in the SQUID varies because this power is the varying voltage times the nominally fixed current through the SQUID. For a voltage across a SQUID that varies slowly, the corresponding varying power is dissipated in the Josephson junctions within the SQUID. For example, the environment around platform 200 includes a slowly varying magnetic field, such as the Earth's magnetic field during movement including rotation of the platform 200. The output voltage from the SQUIDs within cryogenic electronic circuits 210, 211, and 212 varies in response to this environmental variation. As the output voltage from a SQUID increases above its operating point, the power dissipation increases in its Josephson junctions, tending to increase the resistance of the Josephson junctions. Conversely, as the output voltage from a SQUID decreases below its operating point, the power dissipation decreases in its Josephson junctions, tending to decrease the resistance of the Josephson junctions. These effects produce a feedback loop that tends to exaggerate changes in the output voltage from each SQUID. Embodiments of the invention compensate for this feedback loop to improve measurement accuracy.

In one embodiment, the respective cryogenic electronic circuit 210, 211, or 212 disposed on each of the cold blades 230, 231, and 232 includes a power sensor for measuring a respective product of a voltage and a current delivered to the respective cryogenic electronic circuit 210, 211, or 212. The thermal regulator 250 controls the heaters 240, 241, and 242 to dissipate a respective heat in the respective heaters 240, 241, or 242 disposed on each of the cold blades 230, 231, and 232. The thermal regulator 250 controls the heaters 240, 241, and 242 so that a sum of the respective heat and the respective product becomes a predetermined power that maintains the predetermined temperature at the respective cryogenic electronic circuit 210, 211, or 212 disposed on each of the cold blades 230, 231, and 232. The thermal regulator 250 controls the heaters 240, 241, and 242 to maintain, for each of the cold blades 230, 231, and 232, the predetermined temperature of the respective cryogenic electronic circuit 210, 211, or 212 despite varying power dissipation in the respective cryogenic electronic circuit 210, 211, or 212 in response to the varying environment around the platform 200.

In one embodiment, the platform 200 includes the cryogenic cooler for cooling the cold distribution plate 220. The thermal regulator 250 includes a Kalman filter modeling the thermodynamic behavior of the cryogenic cooler, the cold distribution plate 220, the cold blades 230, 231, and 232, the cryogenic electronic circuits 210, 211, and 212, and the heaters 240, 241, and 242. The Kalman filter receives inputs including, for example, the voltage across the SQUID within each cryogenic electronic circuits 210, 211, and 212, the junction temperature within each cryogenic electronic circuits 210, 211, and 212, and a sensed temperature of a cold finger of the cryogenic cooler. The Kalman filter deduces values for certain hidden variables, such as a strength and direction of any external heat source, and thermal resistances among the cold distribution plate 220, the spokes 233, 234, and 235, the planar cold faces 236, 237, and 238, the cryogenic electronic circuits 210, 211, and 212, and the heaters 240, 241, and 242. The Kalman filter might deduce values for the thermal resistances starting from estimated values for the thermal resistances. The Kalman filter controls the heaters 240, 241, and 242 to maintain the predetermined temperature at a temperature sensor for sensing the junction temperature within the respective cryogenic electronic circuit 210, 211, or 212 disposed on each of the cold blades 230, 231, and 232.

In one embodiment, the cold distribution plate 220 includes respective slots 260, 261, or 262 for the cold blades 230, 231, and 232. A respective slot 260 for the pair of cold blades 230 and 232 increases thermal isolation between the planar cold faces 236 and 238 for the pair of cold blades 230 and 232. The remaining slots 261 and 262 similarly increase thermal isolation. This thermal isolation enhances the thermal independence of the cryogenic electronic circuits 210, 211, and 212, and especially nearly eliminates thermal conduction between the non-touching cold blades 230, 231, and 232. However, thermal coupling remains and should be compensated in embodiments of the invention due to convective and radiative coupling between the cold blades 230, 231, and 232. Convective coupling can be reduced with a radome holding the platform 200 in a vacuum or a light gas.

From the above description of Platform for Precise Thermal Regulation of Cryogenic Electronic Circuits, it is manifest that various techniques may be used for implementing the concepts of platforms 100 and 200 without departing from the scope of the claims. The described embodiments are to be considered in all respects as illustrative and not restrictive. The platforms 100 and 200 disclosed herein may be practiced in the absence of any element that is not specifically claimed and/or disclosed herein. It should also be understood that each platform 100 or 200 is not limited to the particular embodiments described herein, but is capable of many embodiments without departing from the scope of the claims.

We claim:

1. A platform for precise thermal regulation of cryogenic electronic circuits, the platform comprising:
   a cold distribution plate for coupling to a cryogenic cooler for cooling the cold distribution plate;
   a plurality of cold blades contacting and extending from a periphery of the cold distribution plate, the cold blades for supporting and cooling the cryogenic electronic circuits, which include a respective cryogenic electronic circuit disposed on each of the cold blades;
   a plurality of heaters for heating the cold blades, the heaters including a respective heater disposed at each of the cold blades; and
   a thermal regulator for controlling the heaters to maintain a predetermined temperature at each of the cryogenic electronic circuits;

wherein the respective cryogenic electronic circuit disposed on each of the cold blades includes a field sensor for sensing a component of a magnetic field perpendicular to the cold blade.

2. The platform of claim 1, wherein the thermal regulator is for controlling the heaters to maintain the predetermined temperature of the respective cryogenic electronic circuit disposed on each of the cold blades despite variation in a thermal and radiation environment around the platform.

3. The platform of claim 2, wherein the thermal regulator is for controlling the heaters to maintain, for each of the cold blades, the predetermined temperature of the respective cryogenic electronic circuit despite varying power dissipation of the respective cryogenic electronic circuit in response to the variation in the thermal and radiation environment around the platform.

4. The platform of claim 1, wherein the plurality of cold blades is three cold blades including three planar cold faces, which do not touch and symmetrically surround an axis perpendicular to a base plane through the cold distribution plate.

5. The platform of claim 4, wherein the three planar cold faces are symmetrically disposed at an angle to the axis so the three planar cold faces are mutually perpendicular.

6. The platform of claim 5, further comprising:
the cryogenic electronic circuits, wherein
the respective cryogenic electronic circuit disposed on each one of the three planar cold faces includes the field sensor for sensing a component of a magnetic field perpendicular to a said one of the three planar cold faces.

7. The platform of claim 6, wherein the component of the magnetic field for each of the three planar cold faces collectively specify a vector describing a direction and a strength of the magnetic field.

8. The platform of claim 6, wherein the component of the magnetic field for each of the three planar cold faces collectively specify a vector describing a propagation direction and an amplitude of an electromagnetic radiation, which produces the magnetic field while propagating into the cryogenic electronic circuits.

9. The platform of claim 6, wherein the field sensor included in the respective cryogenic electronic circuit disposed on each of the three planar cold faces includes a superconducting quantum interference device (SQUID) for sensing the component of the magnetic field.

10. The platform of claim 6, wherein:
the respective cryogenic electronic circuit disposed on each of the three planar cold faces includes a temperature sensor for sensing a junction temperature within the respective cryogenic electronic circuit; and
the thermal regulator is for controlling the heaters to maintain the predetermined temperature at the temperature sensor for sensing the junction temperature within the respective cryogenic electronic circuit disposed on each of the three planar cold faces.

11. The platform of claim 1, wherein the thermal regulator is for controlling the heaters to maintain the predetermined temperature at a temperature sensor for sensing a junction temperature within the respective cryogenic electronic circuit disposed at each of the cold blades.

12. The platform of claim 1, further comprising:
the cryogenic electronic circuits, wherein:
the respective cryogenic electronic circuit disposed on each of the cold blades includes a power sensor for measuring a respective product of a voltage and a current delivered to the respective cryogenic electronic circuit, and
the thermal regulator is for controlling the heaters to dissipate a respective heat in the respective heater disposed on each of the cold blades, so that a sum of the respective heat and the respective product becomes a predetermined power that maintains the predetermined temperature at the respective cryogenic electronic circuit disposed on each of the cold blades.

13. The platform of claim 12, further comprising:
the cryogenic cooler for cooling the cold distribution plate, wherein
the thermal regulator includes a Kalman filter modeling the thermodynamic behavior of the cryogenic cooler, the cold distribution plate, the cold blades, the cryogenic electronic circuits, and the heaters, and the Kalman filter is for controlling the heaters to maintain the predetermined temperature at the respective cryogenic electronic circuit disposed on each of the cold blades.

14. The platform of claim 13, wherein:
the respective cryogenic electronic circuit disposed on each of the cold blades includes a temperature sensor for sensing a junction temperature within the respective cryogenic electronic circuit; and
the Kalman filter is for controlling the heaters to maintain the predetermined temperature at the temperature sensor for sensing the junction temperature within the respective cryogenic electronic circuit disposed on each of the cold blades.

15. The platform of claim 1, wherein the cold blades each include a spoke and a planar cold face, the spoke extending between the periphery of the cold distribution plate and the planar cold face for supporting and cooling the respective cryogenic electronic circuit disposed on the planar cold face.

16. The platform of claim 15, wherein, for each one of the cold blades, the respective heater and the respective cryogenic electronic circuit are disposed on opposite major surfaces of the planar cold face for said one of the cold blades.

17. The platform of claim 15, wherein the cold distribution plate includes respective slots for the cold blades, a respective one of the slots for each pair the cold blades increasing thermal isolation between the planar cold face for each of the pair of cold blades.

18. The platform of claim 15, wherein:
the cold distribution plate is composed of copper that has a high thermal conductivity;
the spoke of each of the cold blades is composed of aluminum nitride that is transparent to radio-frequency electromagnetic radiation and has an intermediate thermal conductivity providing some thermal resistance between the cold distribution plate and the planar cold face; and
the planar cold face of each of the cold blades is composed of diamond that is transparent to radio-frequency electromagnetic radiation and has a high thermal conductivity equalizing the predetermined temperature across an extent of the respective cryogenic electronic circuit disposed on the planar cold face.

19. The platform of claim 18, wherein:
the plurality of cold blades is three cold blades each including the spoke and the planar cold face of one of the cold blades;
the three cold blades do not touch and symmetrically surround an axis perpendicular to a base plane through the cold distribution plate;

the planar cold face of the three cold blades are symmetrically disposed at an angle to the axis and are mutually perpendicular; and the respective cryogenic electronic circuit disposed on the planar cold face of each of the three cold blades includes a superconducting quantum interference device (SQUID) for sensing a component of a magnetic field perpendicular to the planar cold face.

20. The platform of claim 1, wherein for each one of the cold blades:

the respective heater disposed at said one of the cold blades is disposed near a connection between said one of the cold blades and the cold distribution plate; and the respective heater disposed at said one of the cold blades and the respective cryogenic electronic circuit disposed on said one of the cold blades are disposed on opposite major surfaces of said one of the cold blades.

* * * * *